Patented Nov. 10, 1953

2,658,881

UNITED STATES PATENT OFFICE 2,658,881

MOLDABLE MATERIAL COMPRISING ASBESTOS AND A COHYDROLYZATE OF PHENYL SILICON TRIHALIDE AND ETHYL SILICON TRIHALIDE

Alfred Hirsch, Painesville, Ohio, assignor to Diamond Alkali Company, Cleveland, Ohio, a corporation of Delaware No Drawing. Application May 3, 1949,
Serial No. 91,223

8 Claims. (Cl. 260—37)

This invention relates to moldable resinous compositions comprising siloxanes, and more particularly relates to moldable resinous compositions comprising siloxanes obtained from cohydrolyzates of a phenyl silicon trihalide and an ethyl silicon trihalide, in admixture with inorganic filler material.

One of the objects of the present invention is to provide heat-resistant, moldable, resinous, siloxane-containing compositions suitable for use in structural applications and the like especially where high resistance to flow of electric current is paramount, such as electrical instrument panel boards, electrical appliance grips, electrical insulators, and the like. The compositions of the invention also have application for use in abrasive articles such as grinding wheels, friction elements such as brake linings, clutch facings, and the like.

Another object is to provide heat-resistant, resinous, moldable, siloxane-containing compositions of high tensile and flexural strength.

These and other objects will appear from the description of the invention to be set forth more fully hereinafter.

It has long been known that siloxanes, comprising the condensed hydrolyzates of organo-silicon halides or organo-halosilanes, are generally more heat-resistant than their chemical relatives in the family of thermosetting and thermoplastic resinous carbon compounds. Certain of the siloxanes manifest somewhat greater degree of heat resistance at elevated temperatures than others. The siloxane resins exhibiting the highest degree of heat resistance are those obtained from hydrolyzates of organo-silicon trihalides. However, it has heretofore been a disadvantage of these materials that they have been extremely difficult to incorporate into molding compositions. This problem has arisen largely from the general property of this group of siloxanes of having, in general, extremely short transient thermoplastic ranges, due in part to the strong tendency of these hydrolyzates to condense to insoluble, infusible masses during the preparation of the molding composition from the hydrolyzate of the appropriate organo-silicon trihalides. As a result of the tendency of these materials to condense rapidly to insoluble, infusible masses, these materials have had limited application as moldable compositions, as the molded articles obtained therefrom are either very brittle, of low tensile and flexural strength, and for this reason of relatively limited utility, or, because the condensation of the hydrolyzates of these organo-silicon halides has advanced substantially to completion, comprise loose, porous, easily-friable masses, lacking any substantial degree of cohesive strength.

A means for extending the transient thermoplastic range and of improving the tensile and flexural strength of a particularly useful heat-resistant siloxane obtainable from a cohydrolyzate of a phenyl silicon trihalide and an ethyl silicon trihalide is disclosed and claimed in application Ser. No. 31,409, filed June 5, 1948, now abandoned. The moldable compositions there described are characterized in part in that the siloxane portion of the compositions consists of a partially condensed cohydrolyzate of a mixture of 70 to 90 mol per cent of a phenyl silicon trihalide and 10 to 30 mol per cent of an ethyl silicon trihalide.

It has now been found that a moldable, resinous composition of superior heat resistance, together with markedly improved flexural and tensile strength, may be prepared from a partially condensed cohydrolyzate of a mixture of a phenyl silicon trihalide and an ethyl silicon trihalide by incorporating with such cohydrolyzate suitable amounts of certain mineral fillers. More particularly, the present invention includes resinous compositions containing partially condensed cohydrolyzates of a mixture of a phenyl silicon trihalide and an ethyl silicon trihalide, combined with an inorganic filler selected from the group consisting of asbestos and a mixture of asbestos with magnesium oxide.

The phenyl silicon trihalide and ethyl silicon trihalide compounds from which the cohydrolyzates of the present invention are obtained may be any of several phenyl, or ethyl, silicon trihalides but are preferably phenyl and ethyl silicon trichlorides, since these compounds are somewhat more economically produced than the other halide derivatives, particularly the phenyl, or ethyl, silicon tribromide or triiodide and are more amenable to hydrolysis than the phenyl silicon trifluoride or ethyl silicon trifluoride. In the practice of the present invention, ethyl silicon trihalide, preferably ethyl silicon trichloride, is mixed with, for example, phenyl silicon trichloride to the extent of at least 10 mol per cent and preferably not more than 30 mol per cent of the total mixture of the two silicon halide derivatives. In accordance with the disclosure of the said co-pending application, Ser. No. 31,409, now abandoned, it has been found that particularly satisfactory results may be had when the preferred ethyl silicon trichloride is present in the mixture to the extent of 15 to 25 mol per cent and a preferred composition, which has been found to be especially suitable in the manufacture of heat-resistant resinous compositions, is a combination of 80 mol per cent of phenyl silicon trichloride with 20 mol per cent of ethyl silicon trichloride. This preferred ratio of phenyl silicon trihalide to ethyl silicon trihalide yields a cohydrolyzate material possessing a sufficiently extended transient thermoplastic range to permit wide variations of conditions, such as temperature and acidity of the hydrolysis reaction mass, during the hydrolysis of the organo-silicon halide mixture and during the subsequent heat-treating steps necessary to obtain the partially condensed cohydrolyzate material in a solid comminuted fusible form. It has been found that such varying conditions during the initial stages of the preparation do not adversely affect the final product and that a siloxane molding composition of sufficiently extended transient range to yield a continuous solid mass when molded is obtained.

The partially condensed cohydrolyzates of a phenyl silicon trihalide and an ethyl silicon trihalide may be combined with the inorganic filler materials in the compositions of the present invention in any suitable manner. For example, after the mixture of a phenyl silicon trihalide and an ethyl silicon trihalide, preferably the chlorides in solution in a suitable solvent, such as ethyl ether or isopropyl ether, has been added to a mixture of ice and water in order to hydrolyze the silicon halide compounds, and the cohydrolyzate of the organo-silicon halides in ether solution has been recovered from the hydrolysis reaction mass, the ether solution of such cohydrolyzate may be added to a dry mass of asbestos fibers, or to a mixture of comminuted magnesium oxide and asbestos fibers.

Another method of combining the cohydrolyzates with the inorganic materials of the composition includes recovering the ether solution of the cohydrolyzate, as hereinabove described, evaporating the solvent ether therefrom, and recovering the partially condensed cohydrolyzate as a hard, fusible, solid material which may readily be comminuted to a fine, light powder. Thereafter, the powdery cohydrolyzate may be mixed with dry asbestos fiber or a mixture of asbestos fiber with comminuted magnesium oxide.

The asbestos or combined asbestos and magnesium oxide may be employed in an amount ranging from 1:1 to 1:4 parts by weight of the hydrolyzate to the asbestos or mixture of asbestos with magnesium oxide. A suitable solvent, preferably a ketone, such as acetone or methyl ethyl ketone, is added to the mixture in an amount sufficient to wet all of the dry ingredients. Finally, the wetted mixture is kneaded in a mechanical mixer, preferably one having a cutting and mixing action, such as a "Banbury" mixer or a "Day" mixer, and during such mixing, the small amount of solvent retained in the mixture may be driven off by indirectly applying heat thereto during the kneading operation. This procedure results in a substantially dry composition in the form of relatively small agglomerates, which agglomerates may suitably be further comminuted in order to obtain the molding composition in powder form.

Thereafter, shapes may be obtained by molding the powdered molding composition under heat and pressure, for example, at a temperature of 250° to 350° F., and at a pressure of approximately 2000–4000 pounds per square inch for a period of from one to two hours. After the molding operation has been completed, the molded shape may be removed from the mold while hot and may suitably be subjected to further heating, for example, at 475° to 550° F., for a period of 8–16 hours in order to effect the final curing of the siloxane portion of the composition, i. e., to effect the final substantially complete intermolecular condensation of the cohydrolyzate in the composition.

When employing asbestos fibers in the compositions of the present invention, it has been found that fibers of such length that approximately 75% of a given mass thereof are retained on a U. S. Standard No. 14 screen (12 mesh) give an especially strong tenacious cured molded article.

When employing a mixture of magnesium oxide and asbestos in the compositions of the present invention, suitable ratios of magnesium oxide to asbestos fiber have been found within the range of 1:1 to 1:7.5 parts by weight, preferably from 1:2.5 to 1:5 parts by weight.

The magnesium oxide comprising one of the preferred inert fillers may be used in any suitably calcined, relatively fine form. Thus, material of an average particle size to pass a 200 mesh screen is, in general, useful though materials of much finer particle sizes of the order of 50 microns diameter or less may be used and are in general preferred. There appears to be no limit but practical considerations to the lower limit of particle size.

The asbestos of the compositions of the present invention, in addition to the fibrous form thereof described in some detail hereinabove, also includes asbestos fibers generally in web form, such as asbestos paper or asbestos cloth. Where asbestos paper or cloth is used in the compositions of the present invention, it has been found desirable to disperse the partially condensed cohydrolyzates in a suitable solvent, with or without the addition thereto of magnesium oxide, and to immerse the asbestos paper or cloth in the dispersion, and subsequently remove the solvent from the adhering dispersion prior to subjecting the thus-treated asbestos paper or cloth, either in the form of single sheets or as laminates, to shaping by molding. Ordinarily, when employing a cohydrolyzate solution or dispersion containing 55% to 60% solids, the amount of dispersed material (solvent-free basis) adhering to the asbestos fiber or cloth varies from about 15% to about 40% of the weight of the paper or cloth, depending in part upon the density thereof.

In addition to the ingredients above noted, it has been found desirable, in most molding compositions within the scope of the present invention, to accelerate the rate of intermolecular condensation, or rate of cure, as it is frequently referred to, of the partially condensed cohydrolyzate during the final heating step above described by incorporating in the solution of cohydrolyzate obtained from the hydrolysis reaction mass, a relatively small amount of an organic cure accelerator, such as the mild organic bases, for example, the lower alkylol amines, specifically ethanolamine, diethanolamine, diethylamino ethanol, dimethylamino ethanol, propanolamine, dipropylamino propanol, and the like. In addition to these mild organic bases, certain heavy metal salts of a crude mixture of organic acids extracted from petroleum and known as naphthenic acids, such as lead, cobalt, and manganese naphthenates, and 2-ethyl lead hexanoate, a specific salt related to the general class of naphthenates, may also be employed as cure accelerators. Where cure accelerators are employed in the compositions of the present invention, the cure time after molding may be decreased to about 4 to 6 hours.

In order that those skilled in the art may better understand the nature of the compositions of the present invention and methods by which the same may be obtained, the following specific example is offered:

EXAMPLE

A mixture of organo-silicon trichlorides, containing 80 mol per cent of phenyl silicon trichloride and 20 mol per cent of ethyl silicon trichloride, is mixed with twice its volume of isopropyl ether and added to a mixture of ice and water in excess of the amount required to effect the hydrolysis of the organo-silicon trichloride mixture. After the hydrolysis reaction has been completed, the solution of the cohydrolyzate in isopropyl ether is separated from the water layer of the hydrolysis mass and dried by distilling a portion of the ether and substantially all of the water therefrom. There is obtained from this distillation a solution containing 57% of the partially condensed cohydrolyzate of phenyl silicon trichloride and ethyl silicon trichloride in isopropyl ether. This solution is then used to prepare a series of compositions containing various amounts of asbestos fiber, characterized in part by the fact that approximately 75% of the fibers is retained on a U. S. Standard No. 14 screen (12 mesh), and magnesium oxide of a light calcined variety having a particle size averaging 50 microns in diameter or less. The inorganic portion of the compositions is added to the ether solution of the cohydrolyzate and thereafter, triethanolamine is added to the mixture of inorganic filler and cohydrolyzate in the amount of 1% by weight of the amount of the cohydrolyzate in the composition. During the wet mixing of the ingredients in a "Banbury" type mixer, the residual solvent isopropyl ether is evaporated from the mixture by admitting steam to the jacket of the mixer, the substantially solvent-free composition being obtained at the end of the mixing period of approximately 10 minutes in the form of small, solid agglomerates. The compositions in the form of soft agglomerates of hydrolyzate and inorganic material are further dried by heating at approximately 195° F. in order to insure substantially complete removal of the solvent. The compositions thus dried are then passed through a hammer mill in order to comminute the same to the form of very fine, light powders. Moldings are obtained by placing a suitable amount of these powders in a mold having a cavity of the desired shape for the article finally to be obtained, and subjecting the molding composition to a temperature of 350° F. at a pressure of approximately 4000 pounds per square inch for one hour. The molded shapes are removed from the mold while still hot and subjected to further heating, for example, at a temperature of 500–525° F. for a period of 2 to 3 hours in order to complete the cure of the hydrolyzate portion of the composition.

A series of moldable compositions prepared in the detailed manner set forth immediately above and some of the physical properties of such compositions are set forth in the table below. The ingredients of the compositions are given in percentages by weight of the total mixture; the flexural strength is given in pounds per square inch; and the impact strength is given in foot pounds per inch of notch.

Table

|  | (1) | (2) | (3) | (4) | (5) |
|---|---|---|---|---|---|
| Cohydrolyzate [1]......percent.. | 20 | 25 | 35 | 30 | 40 |
| Asbestos Fiber...........do.... | 80 | 75 | 65 | 50 | 50 |
| Magnesium Oxide......do.... |  |  |  | 20 | 10 |
| Flexural Strength............. | 7,230 | 6,180 | 4,670 | 3,000 | 4,630 |
| Impact Strength.............. | 1.37 | 1.15 | 0.72 | 0.67 | 0.58 |

[1] The cohydrolyzate prepared as noted at the beginning of the example.

The compositions of the present invention are found to have outstanding physical properties, both in the combination of asbestos and hydrolyzate alone and in the combination with magnesium oxide. Moreover, in some way not fully understood at the present time, the magnesium oxide appears to have a specific advantageous effect over other generally similar, equally inert filler materials, such as finely ground silicon dioxide in the form of "Celite," magnesium silicate in the form of vermiculite, barium sulfate, and the like.

Moreover, the compositions of the present invention have outstanding heat resistance while still maintaining their excellent properties to a marked extent at elevated temperatures of the order of 800° F. and for short periods at much higher temperatures.

While there have been described various embodiments of the invention, the products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A moldable resinous composition containing a partially condensed hydrolyzate of a mixture of 70 to 90 mol per cent of phenyl silicon trichloride and 10 to 30 mol per cent of ethyl silicon trichloride to make 100 mol per cent, and an inorganic filler material selected from the group consisting of asbestos and a mixture of asbestos with magnesium oxide, said filler being present in an amount between 50% to 80% of said composition.

2. A molded shape comprising a substantially completely intermolecularly condensed cohydrolyzate of a mixture of 70 to 90 mol per cent of a phenyl silicon trihalide and 10 to 30 mol per cent of an ethyl silicon trihalide to make 100 mol per cent, and an inorganic filler material selected from the group consisting of asbestos and a mixture of asbestos with magnesium oxide, said filler being present in an amount between 50% to 80% of said composition.

3. A molded shape comprising 20% to 50% by weight of a substantially completely intermolecularly condensed cohydrolyzate of a mixture of 70 to 90 mol per cent of phenyl silicon trichloride and from 10 to 30 mol per cent of ethyl silicon trichloride to make 100 mol per cent, and from 50% to 80% by weight of an inorganic filler material selected from the group consisting of asbestos and a mixture of asbestos with magnesium oxide.

4. A moldable resinous composition containing from 20% to 50% by weight of a partially condensed cohydrolyzate of a mixture of 70 to 90 mol per cent of phenyl silicon trichloride and from 10 to 30 mol per cent of ethyl silicon trichloride to make 100 mol per cent, from 50% to 80% by weight of fibrous asbestos, 75% of which passes a 12 mesh screen.

5. A moldable resinous composition containing from 20% to 50% by weight of a partially condensed cohydrolyzate of a mixture of 70 to 90 mol per cent of a phenyl silicon trichloride and from 10 to 30 mol per cent of ethyl silicon trichloride to make 100 mol per cent, from 50% to 80% by weight of a mixture of asbestos with comminuted magnesium oxide having a particle size such that substantially 100% of its particles will pass through a 200 mesh screen.

6. A moldable resinous composition containing from 20% to 50% by weight of a partially condensed cohydrolyzate of a mixture of 70 to 90 mol per cent of phenyl silicon trichloride and from 10 to 30 mol per cent of ethyl silicon trichloride to make 100 mol per cent, from 50% to 80% by weight of fibrous asbestos, 75% of which passes through a 12 mesh screen, and magnesium oxide having an average particle size of less than 50 microns.

7. A moldable resinous composition containing from 20% to 50% by weight of a cohydrolyzate of a mixture of 70 to 90 mol per cent of phenyl silicon trichloride and from 10 to 30 mol per cent of ethyl silicon trichloride to make 100 mol per cent, and from 50% to 80% by weight of asbestos web.

8. A moldable resinous composition containing from 20% to 50% by weight of a cohydrolyzate of a mixture of 70 to 90 mol per cent of phenyl silicon trichloride and from 10 to 30 mol per cent of ethyl silicon trichloride to make 100 mol per cent, and from 50% to 80% by weight of a mixture of asbestos web with magnesium oxide.

ALFRED HIRSCH.

References Cited in the file of this patent

UNITED STATES PATENTS

| Number | Name | Date |
| --- | --- | --- |
| 2,258,222 | Rochow | Oct. 7, 1941 |
| 2,450,594 | Hyde | Oct. 5, 1948 |
| 2,460,795 | Warrick | Feb. 1, 1949 |
| 2,528,606 | Pedersen | Nov. 7, 1950 |

OTHER REFERENCES

Plastics Catalog (1943), page 240.